Sept. 30, 1947      H. B. ELLIS      2,428,066
EXHAUST HEAT EXCHANGER
Filed Nov. 17, 1942
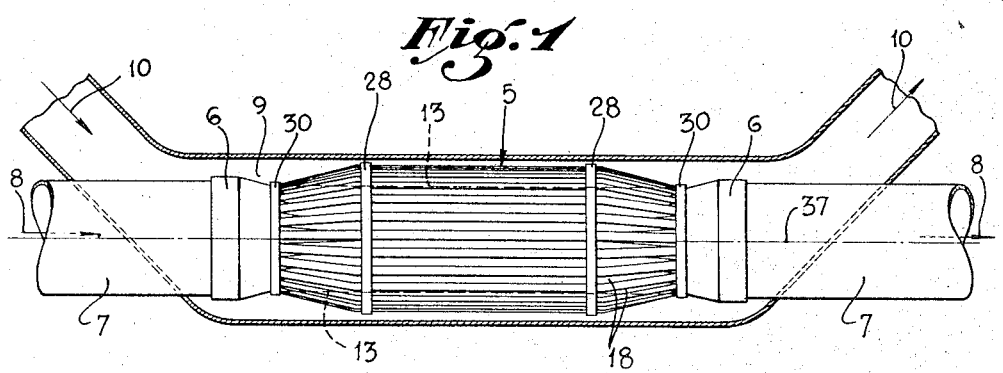
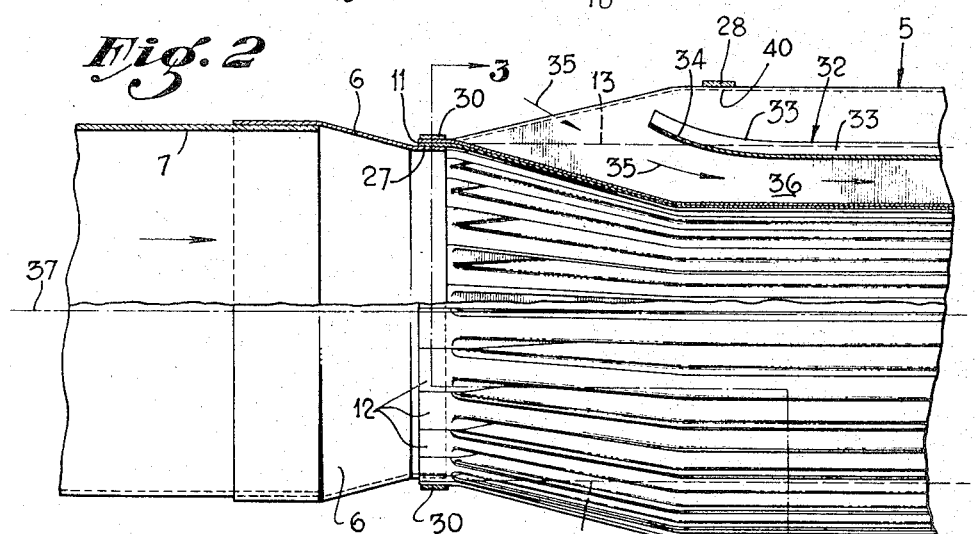
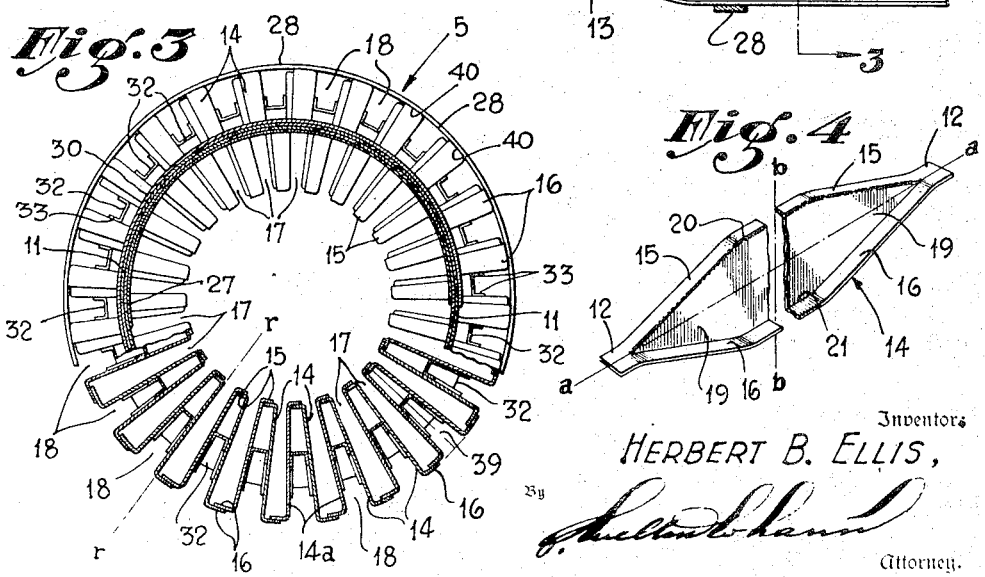
Inventor
HERBERT B. ELLIS,
By
Attorney.

Patented Sept. 30, 1947

2,428,066

UNITED STATES PATENT OFFICE 2,428,066

EXHAUST HEAT EXCHANGER

Herbert B. Ellis, West Los Angeles, Calif., assignor to The Garrett Corporation, Airesearch Manufacturing Company division, Inglewood, Calif., a corporation of California Application November 17, 1942, Serial No. 465,850

3 Claims. (Cl. 257—246)

This invention relates in general to a simple and effective heat exchanger, which term as herein used includes evaporators and condensers for transferring heat from one fluid to another. One form as described herein relates in particular to a heat exchanger for transferring heat from engine exhaust gases into an air stream. A principal use of this form of the invention is in aircraft wherein the flow of air heated by the heat exchanger may be circulated through the hollow interior of the aircraft for the purpose of heating unoccupied portions of the hollow interior, the outside skin, or through another heat exchanger for warming the occupied spaces or passenger compartments of the aircraft. The invention may also be used in aircraft for the purpose of removing sufficient heat from the engine exhaust gases as to render them ordinarily invisible in the outlet portion of the exhaust duct and in the adjacent external atmosphere and reduce the temperature of exhaust gases at the exhaust gas turbo inlet, thereby making the operating conditions for such a turbo less severe.

It is an object of the invention to provide a heat exchanger whose service life is prolonged by the prevention of high thermal stresses caused by uneven temperature distribution in the structure under conditions which may be made severe by a large difference in fluid temperature, such as between engine exhaust gases and atmospheric air.

It is an object of the invention to provide a light weight heat exchanger with a reasonable service life which may be installed in the severe operating conditions of corrosion, erosion, temperature, and vibration such as found in the engine exhaust stack, or exhaust manifold.

It is an object of the invention to provide a heat exchanger comprising interior and exterior fluid passages with no indirect heat conducting surfaces in the interior fluid stream, thereby forming a structure suitable for installation in an engine exhaust stack or exhaust manifold up stream from an exhaust turbo, as in the event any of the metal exposed to the exhaust gases flowing in the interior passage is burned, corroded or eroded completely through the loose pieces caused by such a failure would be carried outward into the exterior fluid passage by the escaping exhaust gases when the pressure in the exterior passage is lower than the pressure in the interior passage.

It is an object of the invention to provide an efficient heat exchanger, which has a high ratio of heat transfer to pressure drop in the two fluid streams, or this may also be stated as a low amount of work or energy required or expended in transferring the heat.

It is a further object of the invention to provide a simple and light weight heat exchanger having the utility herein described, which may be readily made from metal stock by the use of known metal fabricating, forming and welding apparatus and methods.

Further objects and advantages of the invention may appear throughout the following part of this specification.

Referring to the drawing, this is for illustrative purposes only.

Fig. 1 is a view showing a preferred embodiment of the heat exchanger located in an air passage.

Fig. 2 is an enlarged fragmentary, partly sectioned, view of the leftward end of the heat exchanger.

Fig. 3 is a cross-section, taken as indicated by the line 3—3 of Fig. 2.

Fig. 4 is a perspective view of the formed plate employed in multiplicate in constructing the heat exchanger, the view showing the plate shortened by removal of the central section therefrom.

In Figs. 1 and 3 the heat exchanger 5 is shown as providing a plurality of interleaved thin walled interior channels 17 and exterior channels 18 disposed in parallel relation to the longitudinal axis 37 of the heat exchanger and in substantially parallel relation to each other, in surrounding relation to the axis 37 so as to define an interior passage through which the exhaust gases flow, there being means at the opposite ends of the heat exchanger for connecting it to the adjacent portions of the exhaust stack 7. This causes the two fluid streams to flow through the heat exchanger 5 in an essentially parallel relation, either in the same direction, often referred to as concurrent flow, or in the opposite direction, often referred to as counter flow. Uniform temperature distribution in the structure throughout any cross section normal to the longitudinal axis 37 is accomplished by the combining of said concurrent or counter flow with proper fluid distribution, as described hereinbelow and with fluid channels 17 and 18 of sufficient dimensions to insure turbulent flow under operating conditions, which may be described by Reynold's numbers materially in excess of 3000. When the temperature in a structure can be maintained uniformly over all cross sections normal to a longitudinal axis, the main thermal stresses may be relieved by allowing for the axial expansion of the structure in the installation.

The desired fluid flow distribution in the inner fluid channels is preferably, but not necessarily, obtained by maintaining approximately a uniform cross sectional area of the inner fluid passage at any cross section perpendicular to the inner fluid flow direction at any longitudinal position between the annular end members 11. Changes in this cross sectional area can be present with satisfactory results. The desired fluid flow distribution in the outer fluid channels 18 is obtained by a means, such as members 32, for distributing said fluid flow approximately uniformly throughout the outer channel 18 except it is apparently desirable to deflect an excess of fluid flow along the bottom of the tapered end portions 38 of the channels to prevent overheating caused by the direct impingement of the hot fluid in the inner passage on these portions.

In Fig. 1 the heat exchanger 5 is shown connected by short tubular fittings 6 to adjacent portions 7 of the exhaust stack, through which engine exhaust gases pass as indicated by arrows 8. The heat exchanger 5 is located within a passage or chamber 9, through which air to be heated is moved in a selected direction, as indicated by arrows 10.

The heat exchanger 5 has at the ends thereof hollow end members 11, through which connection of the ends of the heat exchanger 5 with the fittings 6 of the exhaust stack 7 is accomplished. These fittings 6 may be of any form such as an elbow, reducer, adapter, etc., or may be entirely dispensed with, the heat exchanger 5 then being connected directly to the stack 7. As indicated by dotted lines 13, the annular end members 11 define a prismoidal space or imaginary solid, extending from one end member to the other. These dotted lines 13 represent the bounds of a path of flow for the gas, where the end members 11 are merely connected by a tube having the same diameter as the end members. For the purpose of explanation and description to be hereinafter given, the dotted lines 13 may be referred to as defining the surface of an imaginary solid or prismoidal volume of space having the rings 11 at the ends thereof.

In order to provide a light weight heat exchanger by using thin metal walls between the inner channels 17 and outer channels 18, some means must be employed to reduce the bending stresses in the walls caused by the difference in pressure between the inner and outer fluid streams. There are many ways this may be accomplished, such as by ribbing, curving, or otherwise forming the walls, or by reducing the length of the span 39 of the channel wall. In the illustrative drawings hereto attached, the member 32 was also utilized as a means of dividing said span 39 into two parts, thereby reducing materially the maximum bending stresses encountered.

To provide a heat exchanger as herein described with no indirect heat conducting surfaces in the interior fluid passage, means are required for maintaining the proper dimensions and space relationship of the inner and outer channels 17 and 18. Said means are furnished by the interaction of rings 28 fastened to the outer end 40 of each inner channel 17, the annular end members 11, and the members 32.

To provide an efficient heat exchanger the heat transfer surfaces are all swept directly by both fluid streams, enabling a reduction in the exposed, friction-producing surface from that required if indirect heat conducting surfaces were used; the entrances and exits to the channels 17 and 18 are rounded so as to provide more favorable fluid flow conditions than found in sharp cornered entrances and exits; and the fluid flows are desirably distributed as hereinabove described.

As best shown in Fig. 3, the heat exchanger is made from sheet stock, comprising a plurality of spaced plates 14 and 14a disposed alternately in side by side relation and in consecutive order so as to cross the imaginary cylindric surface which is defined by the end members 11 and which is indicated by the dotted lines 13. These plates 14 and 14a are shown as lying in radial planes, such as the radial plane indicated by the phantom line $r$—$r$ of Fig. 3. It will be recognized, however, that the planes in which the plates 14 and 14a lie need not be truly radial, but that a preferred condition is that they cross the imaginary cylindric surface 13. As further shown in Fig. 3, the plates 14 and 14a have flanges 15 along the inner edges thereof and flanges 16 along the outer edges thereof, which flanges are connected together, by welding or other suitable methods of joining, to alternately connect the inner and outer edges of the radiating plates 14 and 14a in a manner to form between the plates alternate inner and outer channels 17 and 18. The inner channels 17 are open to the interior of the heat exchanger 5, and, being longitudinally directed, receive a portion of the hot exhaust gas, whereby heat therefrom will be conducted through the plates 14 and 14a to air which flows longitudinally through the outer channels 18.

In Fig. 4 I show a plate 14 in perspective. This plate 14 has tapered ends 19 resulting from the convergence of the inner and outer (upper and lower) longitudinal edges 20 and 21 thereof. A flange 15 is turned leftward from the upper edge 20 of the plate 14 and a flange 16 is turned rightward from the lower edge thereof. These bends made by turning the flanges are of suitable radius so as to provide the rounded entrances and exits of the channels formed by the plates 14 and 14a as herein described. The flanges 15 and 16 extend substantially perpendicular to the plate 14 and merge with the plate portions 12 and the ends of the plate 14, which plate portions 12 lie perpendicular to the plane defined by the plate 14 and on the line $a$—$a$ comprising the longitudinal axis of the plate 14. The plate 14, and its flanges 15 and 16, and the end plates 12 are formed, by stamping process, from a single sheet of metal, and it is a feature of this plate 14 that it is symmetrical about its transverse axis $b$—$b$, which axis $b$—$b$ is perpendicular to the longitudinal axis $a$—$a$, and is intermediate the ends of the plate 14. In view of this, the plate 14, Fig. 4, may be rotated through an angle of 180° about the transverse axis $b$—$b$ so that it will then become the plate 14a in the heat exchanger assembly. When the plate 14 is thus turned end for end about the axis $b$—$b$, the inner flange 15 will project rightward and the outer or lower flange 16 will project leftward. In the heat exchanger assembly, as shown in Fig. 3, the plates 14 are disposed with their inner flanges 15 faced clockwise and their outer flanges 16 faced counterclockwise. The plates 14a have their inner flanges 15 thereof faced counterclockwise so as to engage the flanges 15 of the plates 14, and the plates 14a have their outer flanges 16 faced clockwise so as to engage the flanges 16 of the plates 14. It will be noted that the flanges 15 are narrower than the flanges 16. The engaging flanges 15 and 16 are connected, for example, by continuous spot welding, thereby uniting the alternate plates 14 and 14a into a continuous structure. When the plates 14 and 14a are assembled, the plate portions 12 and the ends thereof overlap and are welded together so as to form the ring-like end members 11 of uniform thickness, which receive the ends of the tubular fittings 6. If desired, these end members 11 may be welded to the cylindrical end portions 27 of the tubular connectors 6.

Means for supporting the intermediate portions of the plates 14 and 14a and for directing air into the bottoms or inner portions of the air channels 18 comprise metal strips 32 disposed in the external channels 18 in the manner shown in Figs. 2 and 3. These metal strips 32 have flanges 33 which are secured to adjacent walls 14 and 14a. The ends of the strips 32 are curved outwardly as shown at 34, so that they will serve as baffles for directing portions of the air stream, as indicated by arrows 35, into the inner portions 36 of the outer channels 18.

Rings 28 are placed around the assemblage of plates 14 and 14a and are fastened to flange 16 of each plate 14 around the circumference to limit the expansion of the heat exchanger 5 and to hold and maintain the petals composed of plates 14 and 14a in the proper space relationship. Reenforcing rings 30 may be placed around the end members 11 if required to make that joint between the ends of the heat exchanger 5 and the tubular fitting 6 amply strong.

I claim as my invention:

1. A heat exchanger of the class described having open ends for connecting the heat exchanger in an exhaust stack, said open ends defining an imaginary surface of an imaginary solid extending between said open ends, said heat exchanger comprising a plurality of thin plates positioned so as to cross said imaginary surface in spaced relation and to lie substantially half inside and half outside said imaginary solid; walls alternately connecting the inner and outer edges of said plates so as to form of the spaces between said plates alternate inner and outer channels, the inner portions of which lie in said imaginary solid and the outer portions of which lie outside of said imaginary solid and means in said outer channels to direct fluid into the bottoms of said outer channels.

2. A heat exchanger of the class described having open ends for connecting the heat exchanger in an exhaust stack, said open ends defining an imaginary surface of an imaginary solid extending between said open ends, said heat exchanger comprising a plurality of thin plates disposed in spaced side-by-side relation radially crossing said imaginary surface and so arranged that the plates extend radially half inside and half outside said solid, said plates being symmetrical about a transverse axis and tapered at their ends, and each plate having flanges projecting at right angles in opposite directions from the upper and lower edges thereof, the flanges of adjacent plates overlapping in circumferential direction and being welded together so as to cooperate with said plates in forming alternating inwardly and outwardly opening radial channels which extend longitudinally of the device, said channels having flat, substantially parallel side walls and having their closed ends lying at right angles to said side walls to form sharp corners at the closed ends of both the inner and outer channels, said channels having their inner portions lying in said imaginary solid and the outer portions of said channels lying outside said imaginary solid, and said outwardly opening radially extending channels having an elongated, U-shaped trough mounted therein and extending radially into said imaginary solid, with the opening of the trough facing outwardly and the trough having both ends bent outwardly into the air stream in such manner as to thereby split the entering air into a stream flowing between the trough and the inner bottom of the radially extending outwardly opening channels, and another stream pursuing a path between the trough and the outer ends of the outwardly opening channels.

3. A heat exchanger of the type described comprising a plurality of thin plates disposed in spaced side by side relationship to form an annular ring, said plates having tapered ends which are secured together to form open ends for the heat exchanger, each of said plates having a flange on each side edge thereof with the flanges extending in opposite directions from the plates, the flanges of adjacent plates overlapping and being secured together to cooperate with said plates to form alternating inwardly and outwardly opening radially disposed channels which extend longitudinally of the heat exchanger with approximately half of each channel lying within an imaginary cylinder formed by a projection of one open end of the heat exchanger to the other open end thereof and with the other half of each channel lying outside such imaginary cylinder, and metal strips extending across said outwardly opening channels along a portion of their length, one end of each of said strips being curved outwardly for deflecting portions of the air streams flowing through such channels into the inner portion of said channels.

HERBERT B. ELLIS.

REFERENCES CITED

The following references are of record in the file of this patent:

UNITED STATES PATENTS

| Number | Name | Date |
| --- | --- | --- |
| 86,373 | Davis | Feb. 2, 1869 |
| 1,261,637 | Sonneborn | Apr. 2, 1918 |
| 1,651,029 | Kelch et al. | Nov. 29, 1927 |
| 1,970,824 | Sunday | Aug. 21, 1934 |
| 1,998,974 | Sunday | Apr. 23, 1935 |
| 2,321,110 | Shipman | June 8, 1943 |

FOREIGN PATENTS

| Number | Country | Date |
| --- | --- | --- |
| 424,853 | Great Britain | Mar. 1, 1935 |